United States Patent [19]
Setikas et al.

[11] Patent Number: 6,079,150
[45] Date of Patent: Jun. 27, 2000

[54] SYSTEMS AND METHODS FOR CONTROLLING INSECTS UNDER SOLID SUBSTRATES

[75] Inventors: Andrew M. Setikas, Santa Rosa, Calif.; James B. Ballard, Medford, N.J.; Terry K. Porter, Valdosta, Ga.

[73] Assignee: FMC Corporation, Philadelphia, Pa.

[21] Appl. No.: 09/188,981

[22] Filed: Nov. 9, 1998

[51] Int. Cl.[7] .................................. A01M 1/20
[52] U.S. Cl. ........................ 43/132.1; 43/131; 52/101
[58] Field of Search .................. 43/107, 124, 131, 43/132.1; 52/101

[56] References Cited

U.S. PATENT DOCUMENTS

| | | | |
|---|---|---|---|
| 2,970,348 | 2/1961 | Imus et al. | 43/131 |
| 3,624,953 | 12/1971 | Crosby | 43/131 |
| 3,835,578 | 9/1974 | Basile | 43/131 |
| 3,940,875 | 3/1976 | Basile | 43/124 |
| 4,043,073 | 8/1977 | Basile | 43/124 |
| 4,102,093 | 7/1978 | Harris | 52/101 |
| 5,390,440 | 2/1995 | Mihealsick | 43/124 |
| 5,564,222 | 10/1996 | Brody | 43/124 |
| 5,655,330 | 8/1997 | Parsons, III | 43/124 |
| 5,778,596 | 7/1998 | Henderson et al. | 43/132.1 |
| 5,802,779 | 9/1998 | Hulls et al. | 52/101 |
| 5,832,658 | 11/1998 | Randon | 43/131 |
| 5,899,018 | 5/1999 | Gordon et al. | 43/131 |
| 5,904,007 | 5/1999 | Trapnell | 52/101 |
| 5,918,427 | 7/1999 | VanderWerf | 52/101 |
| 5,927,000 | 7/1999 | Bordes, Jr. | 43/124 |

FOREIGN PATENT DOCUMENTS

WO 93/23998   12/1993   WIPO.

OTHER PUBLICATIONS

A Technique used on Mounds of *Coptotermes Lacteus* to Sceen Potential Bait Substrates, French and Robinson, J. Aust. ent. Soc., vol. 24, pp. 111–112 (1985).

Termatrol Pro$_{TM}$ Advertisement, Sector Diagnostics L.L.C.

Subterranean Termite Reticulitermes SPP. (Isoptera: Rhinotermitidae) Baiting and Control in Historical Public Buildings in Italy, Ferrari and Marini, Paper, The 32d International Conference on Urban Pests, pp. 357–365 Jul. 19–22, 1999.

*Primary Examiner*—Michael J. Carone
*Assistant Examiner*—Darren W. Ark
*Attorney, Agent, or Firm*—FMC Corporation

[57] ABSTRACT

Methods for controlling insects under solid substrates are provided comprising the steps of providing a substrate that overlays a region in which insects are suspected to reside, the substrate having a first surface, a second surface opposite the first surface, and at least one aperture between the surfaces; and inserting a baiting material into the aperture such that the baiting material extends through the substrate into the region.

15 Claims, 1 Drawing Sheet

SYSTEMS AND METHODS FOR CONTROLLING INSECTS UNDER SOLID SUBSTRATES

The present invention relates to the control of insects such as termites and, in particular, to methods for controlling such insects under solid substrates.

Termites are well known throughout most areas of the world as insects that attack and destroy wooden structures. Subterranean termites most often enter structures from the surrounding soil to feed on wood or other cellulosic material of the structure and its contents. Many methods for killing termites have been employed over the years. One such method involves applying a material that kills or repels termites to the soil in the vicinity of a structure that is to be protected from termites. The extent to which the soil surrounding a structure can be monitored and treated is, however, limited by the presence of solid substrates such as roads, sidewalks, drive ways, and basement slabs overlaying such soil.

Currently, the baiting of termites under solid substrates is performed by drilling large diameter (3–4 inch) holes through a solid substrate beneath which infestation is suspected, inserting a large monitoring station or wooden stake into the soil through the hole to monitor for infestation, and then protecting the station during the monitoring for infestation by placing a cover over the hole. If infestation occurs, the cover is removed, a bait station is placed in the hole, and the cover is replaced.

This method of controlling insects is known to have a number of disadvantages. First, the equipment that is necessary to bore large diameter holes in a solid substrate such as concrete is expensive and cumbersome and, because of its size and cost, is not typically carried by pest control operators (PCOs) in the ordinary course of their business. PCOs typically are not trained in the use of this type of equipment and, thus, must call someone specially trained in using the equipment if the PCO wishes to monitor soil beneath a solid substrate for the presence of insects. Second, the covers that typically are used to protect the monitoring holes are specialized for this application and, consequently, are expensive as well. Third, the above described method is known to disturb the insects because the bait station is placed into the hole after the insects have already entered the monitoring station. This creates an inefficiency in controlling the insects because insects that had previously found their way to the monitoring station will have to find their way to the bait station anew.

Consequently, there is a need in the art for less expensive, less intrusive, and less disruptive methods for controlling insects suspected to reside in regions proximate solid substrates. Additionally, there is a need for methods that can be practiced during the ordinary course of a pest control operator's business with equipment typically carried by the pest control operator.

SUMMARY OF THE INVENTION

The present invention provides methods for controlling insects suspected to be present in a region proximate a solid substrate. In preferred embodiments, these methods involve use of a substrate that overlays a region in which insects are suspected to reside and has a first surface, a second surface opposite the first surface, and at least one aperture between the surfaces. The methods of the invention comprise the step of inserting a baiting material into the aperture such that the baiting material extends through the substrate into the region in which the presence of the insects is suspected. This aperture can have a cross-sectional diameter of up to about 2.5 inches; or the surfaces of the substrate can bear about one aperture per square foot into which baiting material is inserted; or the baiting material can be inserted into a plurality of such apertures that lie within about four feet of one another.

In preferred embodiments, the methods of the invention further comprise the steps of monitoring the baiting material for infestation by said insects, observing insect infestation, and placing an insect control device within about four inches of the baiting material after insect infestation is observed. The insect control device can be affixed to the first surface of the substrate, affixed to the baiting material, or inserted into the aperture either into the baiting material or adjacent thereto.

The present invention also provides insect control systems which, in preferred embodiments, comprise: a substrate that overlays a region in which insects are suspected to reside having a first surface, a second surface opposite the first surface, and at least one aperture between the surfaces; and a baiting material that is within the aperture and extends through the substrate into the region in which the insects are suspected to reside. The aperture preferably has a cross-sectional diameter of up to about 2.5 inches; or the substrate has about one to four apertures per square foot into which baiting material is inserted; or baiting material is inserted into a plurality of said apertures that lie within about four feet of one another.

BRIEF DESCRIPTION OF THE DRAWINGS

The foregoing summary, as well as the following detailed description of the preferred embodiments, is better understood when read in conjunction with the appended drawing. For the purpose of illustrating the invention, the drawings show certain preferred embodiments. It is understood, however, that the invention is not limited to the specific methods disclosed. In the drawings.

DETAILED DESCRIPTION OF THE INVENTION

Figure 1:
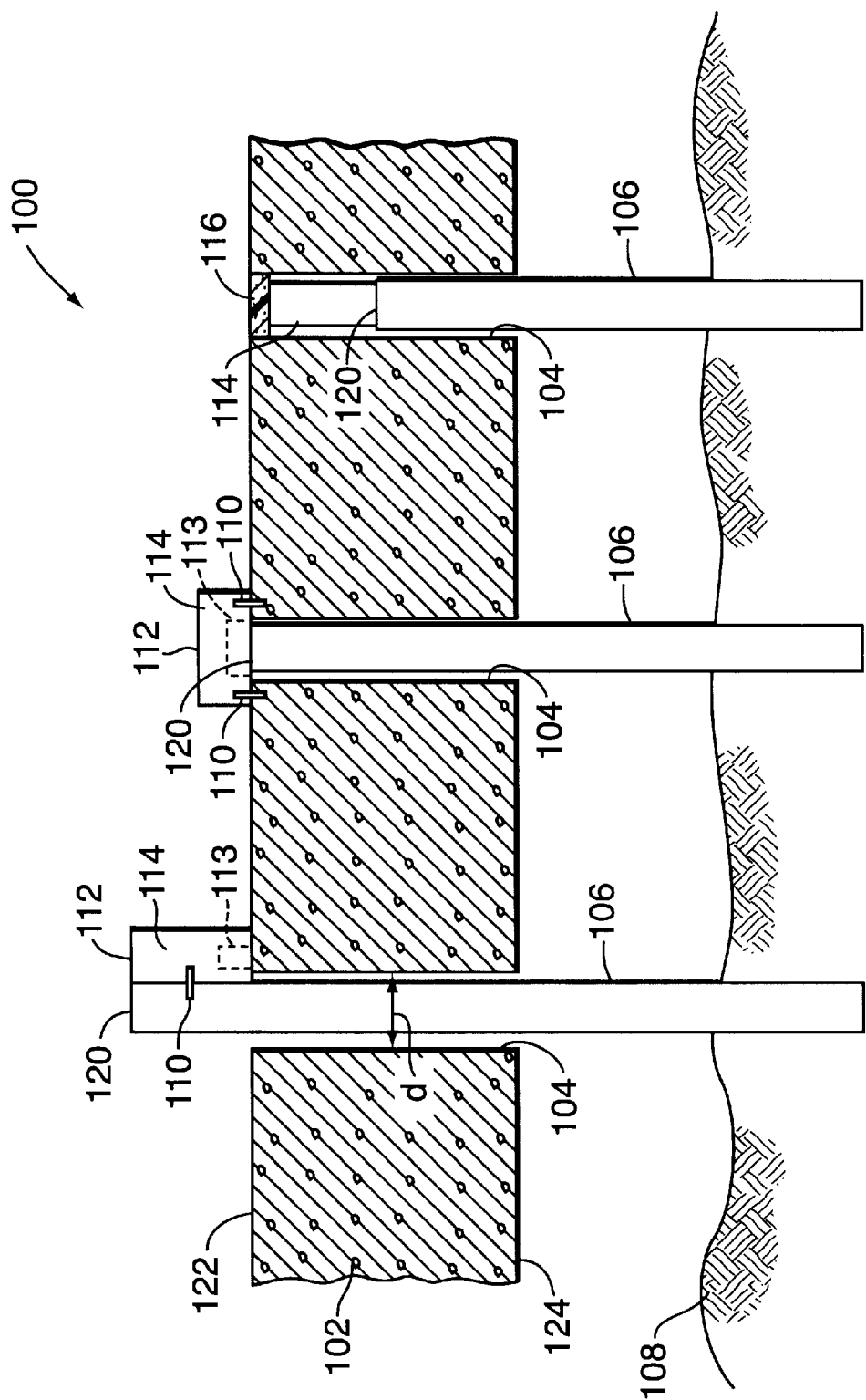
FIG. 1 shows a cross-sectional view of an insect baiting and control system according to the present invention.

The methods and systems of the present invention can be used to control insects. Insects according to the invention include, but are not limited to, termites, ants, bees, wasps, roaches, flies, and yellow jackets. Preferred insects that can be controlled in accordance with the invention are termites and ants. More preferred insects that can be so controlled are termites.

As shown in FIG. 1, an insect baiting and control system 100 according to one embodiment of the present invention comprises a substrate 102 having a first surface 122, a second surface 124, and at least one aperture 104 extending through the substrate between the first and second surfaces thereof. First surface 122 and second surface 124 can have any shape or contour, preferably the first surface, into which baiting material typically is inserted, is substantially flat. First surface 122 and second surface 124 (and, in turn, substrate 102) can have any orientation, although it is preferred that they be either substantially horizontal or substantially vertical. Substrate 102 can be made of any substantially rigid naturally-occurring or synthetic material such as, for example, concrete, asphalt, tile, brick, wood, masonry, plastic, ceramic, plaster, and metal. Substrate 102 also can be the outer covering of a naturally occurring object such as, for example, the bark of a tree. Preferably, substrate 102 is made of concrete as, for example, a sidewalk or basement floor. Depending upon the particular application, substrate 102 preferably has a thickness, t, ranging from about 1 inch to about 24 inches.

System 100 preferably further comprises a baiting material 106. Baiting material 106 can be any material that encourages insect infestation, and through which or around which insects can travel. In certain embodiments, the baiting material is one that is capable of being moved, transported, tunneled into, or ingested by insects. Preferably, baiting material 106 includes or, together with a wall of aperture 104, forms an opening (e.g., a pore or hole) through which insects can travel. In alternative preferred embodiments bait material 106 includes a material through which insects can tunnel. Exemplary baiting materials include, but are not limited to, cellulosics (e.g., wood and cardboard), synthetic polymers (such as polystyrene foam), topsoil, and sand. These materials can have a variety of shapes, including dowels having holes drilled through their bodies or slots scored along their edges, rolled cardboard, blocks of wood, hollow cylinders, bundles of wood pieces, bundles of drinking straws, pellets, or powders (e.g., sawdust). Baiting material 106 also can bear a coating of a material that insects ingest (such as a sugar or protein), an attractive pheromone, or water. A preferred and economical baiting material 106 is a slotted dowel. As used herein and unless otherwise indicated, the term "dowel" should be read to include, without limitation, a rod of wood, synthetic polymer, metal, foam, and any other similar material.

Baiting material 106 preferably is inserted through aperture 104 such that baiting material 106 extends through substrate 102 into a monitoring region 108 proximate substrate 102. Monitoring region 108 is one in which insects are known or suspected to reside. For example, where substrate 102 is a concrete slab such as a basement floor, monitoring region 108 can be the soil located beneath the concrete slab. Baiting material 106 should be long enough to pass through substrate 102 and make good contact with monitoring region 108. That is, baiting material 106 should be inserted sufficiently far into monitoring region 108 to permit insects within monitoring region 108 to make contact with baiting material 106. In a preferred embodiment where monitoring region 108 is soil, baiting material 106 should be inserted a distance of about one inch into the soil. Thus, depending on the thickness of the substrate and the depth needed for contact, baiting material 108 preferably has a length, l, ranging from about one inch to about 40 inches.

Aperture 104 has a cross-sectional diameter, d, that is large enough to accommodate baiting material 106 upon insertion, but not so large as to significantly alter the insects' micro environment (i.e., relative humidity and temperature) in the monitoring region 108. Aperture 104 preferably has a cross-sectional diameter, d, at some point along its length, ranging from about one-eighth inch to about 2.5 inches, more preferably from about one-quarter inch to about one inch.

In certain embodiments of the invention, baiting material 106 is inserted into a plurality of apertures that lie within about four feet of one another (as measured from the center of one aperture to the center of the other). In some embodiments, the apertures lie within about two feet of one another, preferably within about one foot, even more preferably within about four inches. In certain preferred embodiments, substrate 102 includes about one such aperture with baiting material per square foot, preferably about two such apertures per square foot, more preferably about four such apertures per square foot.

In accordance with the present invention, the baiting materials 106 that are inserted into aperture 104 are monitored for infestation by insects. For those apertures 104 in which infestation is found, an insect control device 114 can be placed proximate baiting material 106 such that insects infesting baiting material 106 are led into insect control device 114. Apertures 104 in which no infestation is observed may be sealed with an appropriate material (e.g., cement) to restore the cosmetic appearance of substrate 102.

An insect control device according to the present invention is a material that is toxic to insects or a structure that includes such a material. The control device can, for example, be a compressed pellet of insect toxicant, a piece of wood treated with an insect toxicant, or a perforated metal or plastic housing 112 that contains an insect toxicant or a toxicant-treated material 113. This latter type of control device is sometimes referred to as a bait station.

In preferred embodiments, insect control device 114 is a bait station that is mechanically connected (i.e., affixed) to baiting material 106 or to substrate 102 via screws, plastic straps, adhesives, nails, or other similar mechanical connectors 110. An example of a commercially available bait station that can be utilized in the present invention is the Firstline™ Termite Bait Station (FMC Corporation, Chicago, Ill.). Alternatively, an insect control device 114 such as a piece of wood treated with a slow acting toxicant can be inserted into aperture 104 so as to be positioned on top of, adjacent to, or within baiting material 106. This approach is sometimes referred to as "direct baiting." To avoid disturbing the insects in embodiments of the invention in which direct baiting is employed, aperture 104 can be sealed with a sealant 116 such as, for example, cork, rigid foam insulation, or a cover after insect control device 114 is placed therein. When direct baiting is employed, insect control device 114 preferably comprises either an opening for the insects to travel through or a material (e.g., polystyrene foam) through which the insects can tunnel. Examples of insect control devices 114 that can be used in a direct baiting application include, but are not limited to, slotted or drilled dowels, rolled cardboard, blocks of wood, hollow cylinders, rigid foam insulation, bundles of wood pieces, bundles of drinking straws, moist sand, or sawdust. In addition, insect control device 114 may bear a coating of a food substance (such as sugar or a protein), an attractive pheromone, or water. A slotted dowel is a preferred and economical insect control device 114 suitable for use in a direct baiting application. Examples of slow acting toxicants that can be used to treat insect control device 114 include, but are not limited to, sulfluramid, hexaflumuron, dimilin, hydramethyinon, chitin inhibitors, metabolic inhibitors, growth regulators, boron compounds, protozoacides, or biological agents.

In generally non-public areas, such as basements, it is preferred that baiting material 106 be inserted into aperture 104 in such a manner that the top 120 of baiting material 106 is nearly flush with, or extends slightly beyond, first surface 122 of substrate 102. Thus, insect control device 114 (a bait station, for example) can be placed adjacent to first surface 122 and can be directly connected either to first surface 122 or to baiting material 106. Preferably, in this type of application, baiting material 114 is inserted into aperture 104 so as to extend about one inch into monitoring region 108 and about 12 inches from first surface 122. If direct baiting is to be used, insect control device 114 can be placed inside baiting material 106. Aperture 104 then may be sealed in a manner such as described above.

In more public areas, such as sidewalks, it is preferred that baiting material 106 be inserted into aperture 104 in such a manner that the top 120 of baiting material 106 is recessed into substrate 102. In this way, the public can walk on substrate 102 without disturbing or damaging control system 100, or being disturbed or injured by it. Preferably, in this type of application, baiting material 114 is inserted into aperture 104 so as to extend about one inch into monitoring region 108 and be recessed about 0.25 inches to about 3.5 inches into substrate 102. Once infestation is observed, direct baiting can be accomplished in the same manner as described above (i.e., by inserting insect control device 114 into aperture 104 adjacent to, or inside of, baiting material 106 and then sealing aperture 104).

The methods and apparatus of the present invention generally minimize damage to solid substrates beneath which insects are suspected to reside by eliminating the need to cut large holes in it to gain access to such insects. The methods of the invention also are generally less costly and more efficient because they employ common tools and equipment, and do not require extensive training. Further savings may be realized because the present invention generally involves bringing the insects to a readily-accessible surface of a substrate, which should make controlling the insects easier. In addition, as the apertures of the present invention are relatively small and easy to create, many of them can be employed per unit area, thus increasing the likelihood of locating insects without substantial damaging to the cosmetic appearance of the substrate.

Additional objects, advantages, and novel features of this invention will become apparent to those skilled in the art upon examination of the following examples thereof, which are not intended to be limiting.

EXAMPLE 1

Three plastic wading pools each having a diameter of four feet were filled with soil and a spruce food source and were infested with approximately 10,000 termites. A concrete slab containing four, one-inch wide drilled holes was placed in the center of each pool. Slotted wooden dowels were inserted into the drilled holes so as to extend through the soil to the bottom of the pools and above the surface of the concrete slabs.

After termite infestation was observed (mud tubes appeared in the slots of the dowels), bait stations containing untreated cardboard were placed above the infested holes and the termites were found to infest such stations.

EXAMPLE 2

The general procedure described in Example 1 was repeated using dowels that did not extend above the surface of the slab, but, rather, were flush with it. After the termites constructed mud tubes to the surface of the dowels (an indication that termite infestation was reestablished at the dowels), a Firstline™ Termite Bait Station was installed on the surface of the slab above the infested sites. Approximately 100% control (i.e., kill) of the termite colony was accomplished in an average of 22 days.

EXAMPLE 3

A plastic wading pool having a diameter of four feet is filled with soil and a spruce food source and is infested with approximately 10,000 termites. A concrete slab containing four, one-inch wide drilled holes is placed in the center of the pool, and slotted wooden dowels are inserted into the drilled holes so as to extend through the soil to the bottom of the pools so that the tops of the dowels are about three inches below the surface of the concrete slab. After termite infestation is observed (mud tubes appear in the slots of the dowels), pieces of cardboard treated with sulfluramid are placed on top of the dowels in the infested holes, and the holes are sealed with cork, rigid foam insulation, or a cover.

EXAMPLE 4

The general procedure of Example 3 is repeated, except that after termite infestation is observed, an approximately three-inch long piece of slotted dowel is placed on top of the infested dowel in the hole so that the top of the dowel is level with the surface of the concrete. A termite bait station that is at least similar in function to the, namely FirstlineTm Termite Bait Station (FMC Corporation, Philadelphia, Pa.) is then installed level with the surface.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. A method of controlling insects comprising the steps of:
providing a substrate that overlays a region in which insects are suspected to exist, said substrate having a first surface, a second surface opposite said first surface, and at least one aperture between the surfaces;
inserting a baiting material into said at least one aperture such that said baiting material extends through said substrate into said region;
monitoring said baiting material for said insects;
observing whether said insects exist at said region; and
placing a device comprising an insect toxicant proximate to said baiting material if said observation indicates that said insects exist at said region;
wherein:
said at least one aperture has a cross-sectional diameter of up to about 2.5 inches; or
said substrate has about one of said at least one aperture per square foot into which said baiting material is inserted; or
said at least one aperture comprises a plurality of apertures that lie within about four inches of one another; and
the step of placing said device comprises connecting said device to said baiting material.

2. The method of claim 1, wherein said device is placed proximate to said baiting material such that said insects infesting said baiting material are led into said device.

3. The method of claim 1, wherein said device is about four inches from said baiting material.

4. The method of claim 1, wherein said device is placed less than four inches from said baiting material.

5. The method of claim 1, wherein said device is connected to said baiting material via a mechanical connector.

6. The method of claim 5, wherein said mechanical connector is selected from the group consisting of a screw, a plastic strap, an adhesive, or a nail.

7. The method of claim 1, wherein said baiting material is inserted into said plurality of apertures that lie within about four inches of one another.

8. A method of controlling insects comprising the steps of:
providing a substrate that overlays a region in which insects are suspected to exist, said substrate having a first surface, a second surface opposite said first surface, and at least one aperture between said surfaces;

inserting a baiting material into said at least one aperture such that said baiting material extends through said substrate into said region;

monitoring said baiting material for said insects;

observing whether said insects exist at said region; and placing a device comprising an insect toxicant within about four inches of said baiting material if said observation indicates that said insects exist at said region;

wherein:

said at least one aperture has a cross-sectional diameter of up to about 2.5 inches; or said substrate has about one of said at least one aperture per square foot into which said baiting material is inserted; or said at least one aperture comprises a plurality of apertures that lie within about four inches of one another; and the step of placing said device comprises affixing said device to said first surface or to said baiting material.

9. The method of claim 8, wherein the device is affixed to said first surface.

10. The method of claim 8, wherein the device is affixed to said baiting material.

11. The method of claim 10, wherein the step of placing said device further comprises inserting said device into said aperture.

12. The method of claim 11, wherein said device is inserted into said baiting material.

13. The method of claim 11, wherein said device is placed above or beside said baiting material.

14. The method of claim 11 further comprising the step of sealing said aperture.

15. The method of claim 8, wherein said baiting material is inserted into said plurality of apertures that lie within about four inches of one another.

* * * * *